US010764285B2

(12) United States Patent
Khanna et al.

(10) Patent No.: US 10,764,285 B2
(45) Date of Patent: Sep. 1, 2020

(54) METHOD AND SYSTEM FOR ENCRYPTION USING A RADIO FREQUENCY FINGERPRINT

(71) Applicant: HONDA MOTOR CO., LTD., Minato-ku, Tokyo (JP)

(72) Inventors: Rahul Khanna, Mountain View, CA (US); John P. Moon, San Jose, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 201 days.

(21) Appl. No.: 16/045,323

(22) Filed: Jul. 25, 2018

(65) Prior Publication Data

US 2020/0036710 A1   Jan. 30, 2020

(51) Int. Cl.
*H04L 29/06* (2006.01)
*H04W 12/06* (2009.01)
(52) U.S. Cl.
CPC ......... *H04L 63/0876* (2013.01); *H04W 12/06* (2013.01)
(58) Field of Classification Search
CPC .............................. H04L 63/0876; H04W 12/06
USPC ........................................................ 380/270
See application file for complete search history.

(56) References Cited

U.S. PATENT DOCUMENTS

| | | | | |
|---|---|---|---|---|
| 7,835,319 B2 * | 11/2010 | Sugar | ................... | H04B 17/309 370/328 |
| 8,810,404 B2 * | 8/2014 | Bertoncini | ............ | H04W 12/06 340/10.1 |
| 2005/0123138 A1 * | 6/2005 | Abe | ..................... | H04B 1/7113 380/255 |
| 2011/0033052 A1 * | 2/2011 | Yamada | ................ | H04L 9/0877 380/270 |
| 2016/0366586 A1 * | 12/2016 | Gross | .................... | H04W 12/06 |

OTHER PUBLICATIONS

Boris Danev et al., "On Physical-Layer Identification of Wireless Devices", ACM Computing Surveys, vol. 45, No. 1, Article 6, Nov. 2012.
Gianmarco Baldini et al., "An Analysis of the Privacy Threat in Vehicular Ad Hoc Networks due to Radio Frequency Fingerprinting", Mobile Information Systems, vol. 2017.
Jeyanthi Hall et al., "Detecting Rogue Devices in Bluetooth Networks Using Radio Frequency Fingerprinting", Carleton University, 2006.
Saeed Ur Rehman et al., "Analysis of impersonation attacks on systems using RF fingerprinting and low-end receivers", Journal of Computer and System Sciences, 2013.
Vladimir Brik et al., "Wireless Device Identification with Radiometric Signatures", MobiCom, pp. 14-19, 2008.

* cited by examiner

*Primary Examiner* — Shin-Hon (Eric) Chen
*Assistant Examiner* — Dereena T Cattungal
(74) *Attorney, Agent, or Firm* — Arent Fox LLP

(57) ABSTRACT

Aspects of the present disclosure include methods, apparatus, and computer readable medium for storing encrypted data including receiving a radio frequency signal and data to be encrypted, identifying a radio frequency fingerprint of the signal, generating a numerical representation of the radio frequency fingerprint, generating an encryption key using at least a portion of the representation, encrypting the data using the encryption key, and storing the encrypted data.

17 Claims, 7 Drawing Sheets

US 10,764,285 B2

METHOD AND SYSTEM FOR ENCRYPTION USING A RADIO FREQUENCY FINGERPRINT

TECHNICAL FIELD

The present disclosure relates to encryption of data, and in particular, encryption using radio frequency signals.

BACKGROUND

Data security has become an integral part of modern electronic systems as data protection becomes important in many situations. Data, such as credit card information, social security numbers, and personal information may be protected by encryption. Data encryption may use an encryption key to scramble the data from a recognizable state to an unrecognizable state. To access the encrypted data, a decryption key may be used to restore the data to be read. However, encryption and/or decryption keys may still be acquired by unauthorized users in order to access the information in the encrypted data. In conventional electronic systems, complex key management systems (such as Trusted Platform Module) may be implemented to securely store the encryption/decryption keys to prevent unauthorized access. However, the key management systems may be vulnerable to security attacks such as man-in-the-middle, phishing, social engineering, and malware, among others. Therefore, improvements in cyber security may be desirable.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Aspects of the present disclosure include methods, apparatus, and computer readable medium for storing encrypted data including receiving a radio frequency signal and data to be encrypted, identifying a radio frequency fingerprint of the signal, generating a numerical representation of the radio frequency fingerprint, generating an encryption key using at least a portion of the representation, encrypting the data using the encryption key, and storing the encrypted data.

Aspects of the present disclosure include methods, apparatus, and computer readable medium for storing encrypted data including receiving a radio frequency signal and data to be encrypted, identifying a radio frequency fingerprint of the signal, generating a numerical representation of the radio frequency fingerprint, generating recovery key using at least a portion of the representation, retrieving an encryption key with the recovery key, encrypting the data using the encryption key, and storing the encrypted data.

Aspects of the present disclosure include methods, apparatus, and computer readable medium for decrypting encrypted data including receiving a radio frequency signal, identifying a radio frequency fingerprint of the signal, generating a numerical representation of the radio frequency fingerprint, generating a decryption key using at least a portion of the representation, retrieving encrypted data, and decrypting the encrypted data using the decryption key.

Aspects of the present disclosure include methods, apparatus, and computer readable medium for decrypting encrypted data including receiving a radio frequency signal, identifying a radio frequency fingerprint of the signal, generating a numerical representation of the radio frequency fingerprint, generating recovery key using at least a portion of the representation, retrieving a decryption key with the recovery key, retrieving encrypted data, and decrypting the encrypted data using the decryption key.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

Figure 1:
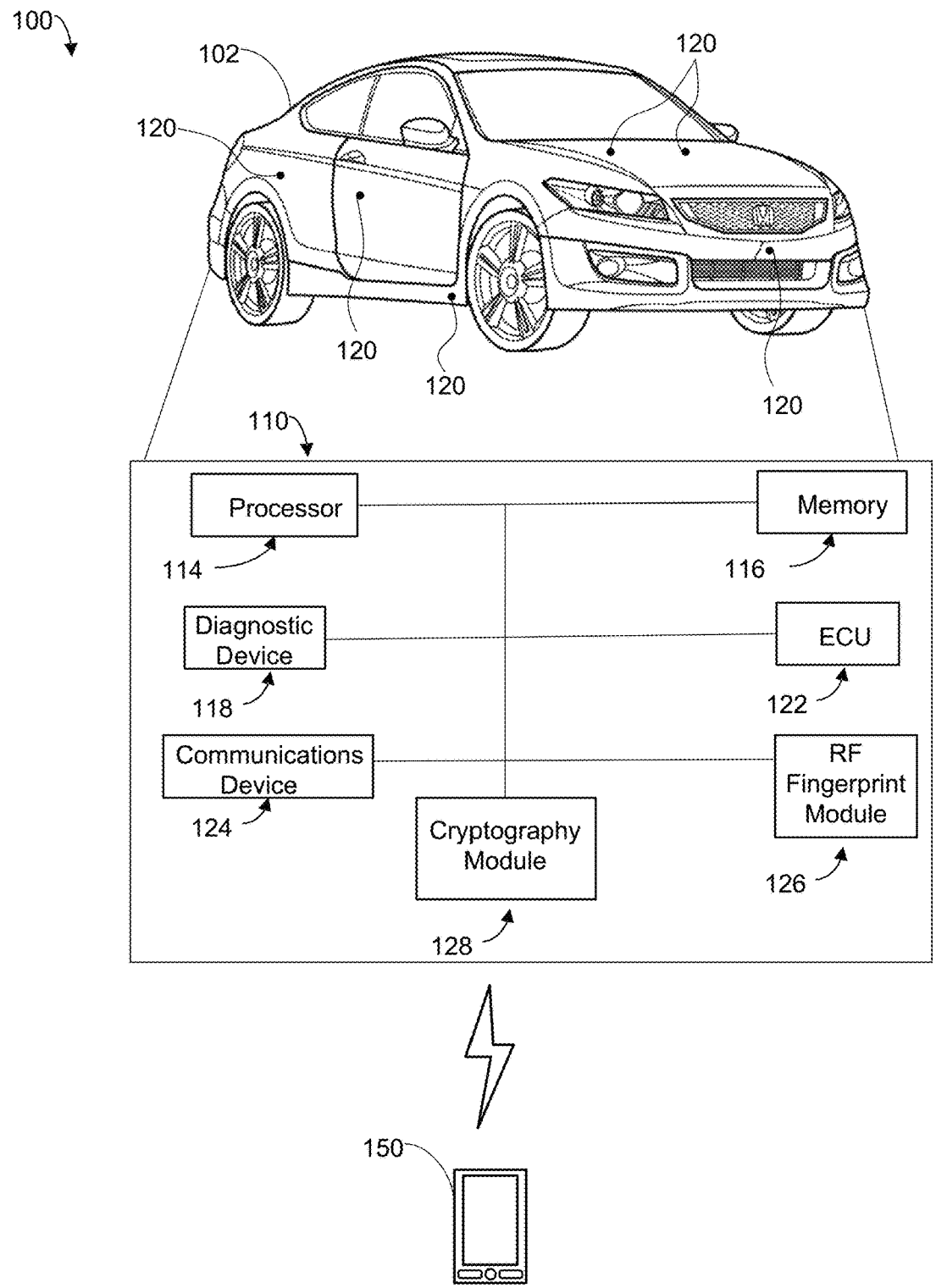
FIG. 1 illustrates a schematic view of an exemplary operating environment of a telematics system in accordance with aspects of the present disclosure.

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, ATVs, boats, personal watercraft, and aircraft. In some cases, a motor vehicle includes one or more engines.

In certain implementations, a cryptography system may rely on a radio-frequency (RF) fingerprint of a signal from a mobile device of a user, for example, to generate an encryption key. The cryptography system may be part of a telematics system of a vehicle. In some implementations, the cryptography system may be part of an infotainment system of the vehicle. The encryption key may be used to encrypt user data. To access the encrypted data, the mobile device of the user may send another signal to the cryptography system. The RF fingerprint of the other signal may be used to generate a decryption key for decrypting the encrypted data. The RF fingerprints may be identical because both fingerprints are associated with the mobile device of the user. The user may use the mobile device to encrypt and decrypt data.

Turning to FIG. 1, a schematic view of a non-limiting example of an operating environment 100 for storing encrypted data may include encryption and decryption of data by a vehicle telematics system 110. The vehicle computer system 110 may reside within a vehicle 102. The vehicle computer system 110 may include a vehicle infotainment system, a vehicle telematics system, or other systems within the vehicle 102. The components of the vehicle computer system 110, as well as the components of other systems, hardware architectures, and software architectures discussed herein, may be combined, omitted or organized into various implementations. In other implementations, the storage of encrypted data may be performed by general computer systems, such as a computer system 200 shown in FIG. 2.

Referring to FIG. 1, the vehicle 102 may generally include an electronic control unit (ECU) 122 that operably controls a plurality of vehicle systems. The vehicle systems may include, but are not limited to, the vehicle computer system 110, among others, including vehicle HVAC systems, vehicle audio systems, vehicle video systems, vehicle infotainment systems, vehicle telephone systems, vehicle control systems, and the like.

The vehicle 102 may further include a communications device 124 (e.g., wireless modem) for providing wired or wireless computer communications utilizing various protocols to send/receive electronic signals internally with respect to features and systems within the vehicle 102 and with respect to external devices. These protocols may include a wireless system utilizing RF communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 124 of the vehicle 102 may be operably connected for internal computer communication via a bus (e.g., a CAN or a LIN protocol bus) to facilitate data input and output between the electronic control unit 122 and vehicle features and systems. In an aspect, the communications device 124 may be configured for vehicle-to-vehicle (V2V) communications. For example, V2V communications may include wireless communications over a reserved frequency spectrum. As another example, V2V communications may include an ad hoc network between vehicles set up using Wi-Fi or Bluetooth®.

In some implementations, the vehicle computer system 110 may include a diagnostic device 118 and one or more sensors 120. The diagnostic device 118 may obtain information from the sensors 120. The sensors 120 may be disposed throughout the vehicle 102, and collect information such as fuel quantity, fuel range, speedometer reading, odometer reading, door locks status, global positioning system (GPS) data, entertainment system data, tire pressure reading, battery reading, fluid level, and other information relevant to the operation of the vehicle 102.

In certain examples, a mobile device 150 belonging to a driver of the vehicle 102 may transmit a radio frequency (RF) signal to the vehicle computer system 110. The transmitted signal may include an RF fingerprint associated with the transceiver (not shown) of the mobile device 150. The vehicle computer system 110 may include an RF fingerprint module 126. The RF fingerprint module 126 may be configured to identify the RF fingerprint of the RF signal received via the communications device 124 or directly by the fingerprint module 126. Upon identifying an RF fingerprint of a signal, the RF fingerprint module 126 may generate a numerical representation of the identified RF fingerprint.

In other examples, the vehicle computer system 110 may include a cryptography module 128. The cryptography system 128 may be configured to generate an encryption key based on the numerical representation of the identified RF fingerprint. Once the encryption key is generated, the cryptography system 128 may encrypt data. The cryptography system 128 may further decrypt encrypted data using a decryption key.

Figure 2:
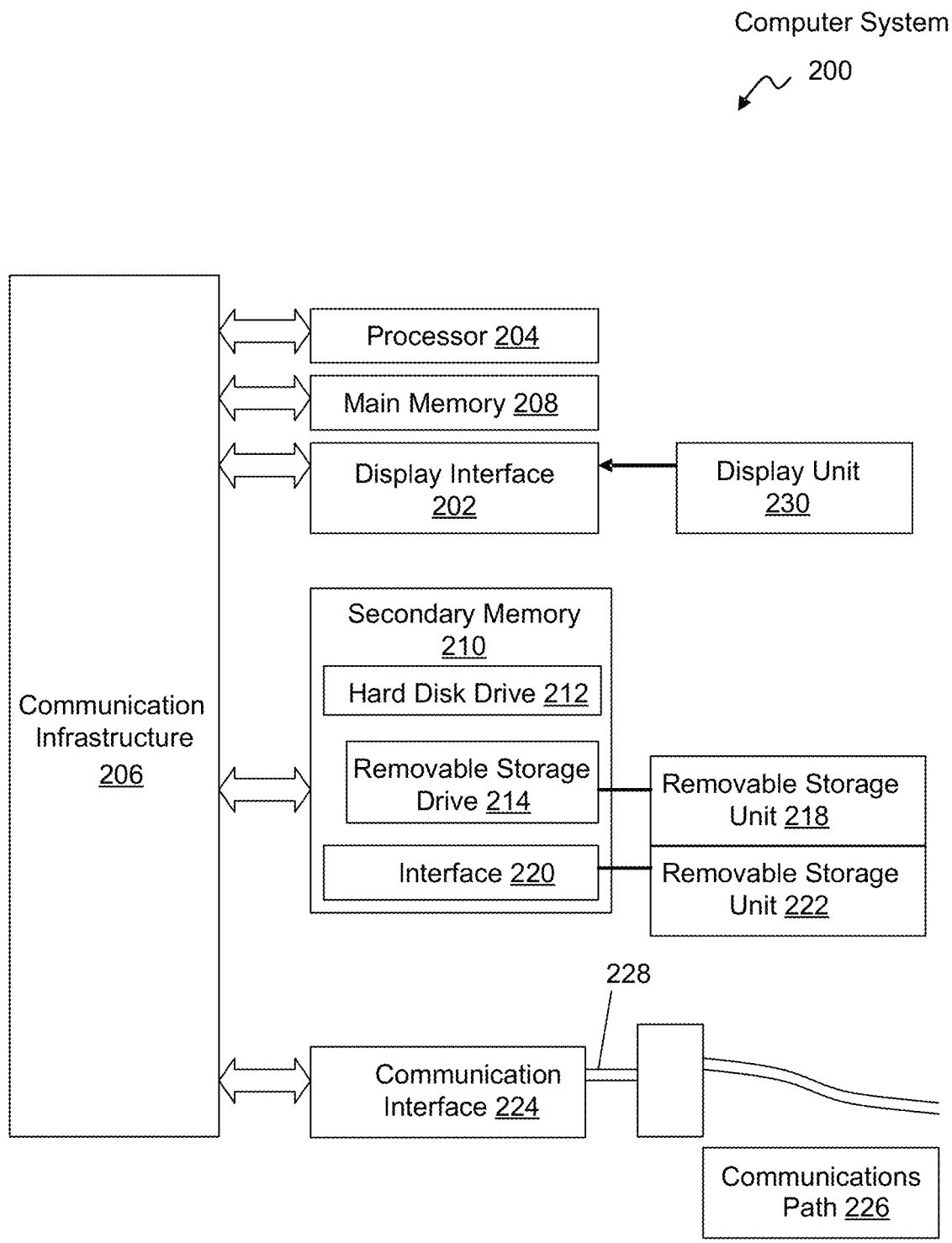
FIG. 2 illustrates an exemplary computer system for implementing a method of cyber security in accordance with aspects of the present disclosure.

Aspects of the present disclosures may be implemented using hardware, software, or a combination thereof and may be implemented in one or more computer systems or other processing systems. In an aspect of the present disclosures, features are directed toward one or more computer systems capable of carrying out the functionality described herein. An example of such the computer system 200 is shown in FIG. 2.

The computer system 200 includes one or more processors, such as processor 204. The processor 204 is connected to a communication infrastructure 206 (e.g., a communications bus, cross-over bar, or network). Various software aspects are described in terms of this example computer system. After reading this description, it will become apparent to a person skilled in the relevant art(s) how to implement aspects of the disclosures using other computer systems and/or architectures.

The computer system 200 may include a display interface 202 that forwards graphics, text, and other data from the communication infrastructure 206 (or from a frame buffer not shown) for display on a display unit 230. Computer system 200 also includes a main memory 208, preferably random access memory (RAM), and may also include a secondary memory 210. The secondary memory 210 may include, for example, a hard disk drive 212, and/or a removable storage drive 214, representing a floppy disk drive, a magnetic tape drive, an optical disk drive, a universal serial bus (USB) flash drive, etc. The removable storage drive 214 reads from and/or writes to a removable storage unit 218 in a well-known manner. Removable storage unit 218 represents a floppy disk, magnetic tape, optical disk, USB flash drive etc., which is read by and written to removable storage drive 214. As will be appreciated, the removable storage unit 218 includes a computer usable storage medium having stored therein computer software and/or data.

Alternative aspects of the present disclosures may include secondary memory 210 and may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, an RF link and/or other communications channels. In this document, the terms "computer program medium" and "computer usable medium" are used to refer generally to media such as a removable storage drive 218, a hard disk installed in hard disk drive 212, and signals 228. These computer program products provide software to the computer system 200. Aspects of the present disclosures are directed to such computer program products.

Computer programs (also referred to as computer control logic) are stored in main memory 208 and/or secondary memory 210. Computer programs may also be received via communications interface 224. Such computer programs, when executed, enable the computer system 200 to perform the features in accordance with aspects of the present disclosures, as discussed herein. In particular, the computer programs, when executed, enable the processor 204 to perform the features in accordance with aspects of the present disclosures. Accordingly, such computer programs represent controllers of the computer system 200.

In an aspect of the present disclosures where the method is implemented using software, the software may be stored in a computer program product and loaded into computer system 200 using removable storage drive 214, hard drive 212, or communications interface 220. The control logic (software), when executed by the processor 204, causes the processor 204 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

Figure 3:
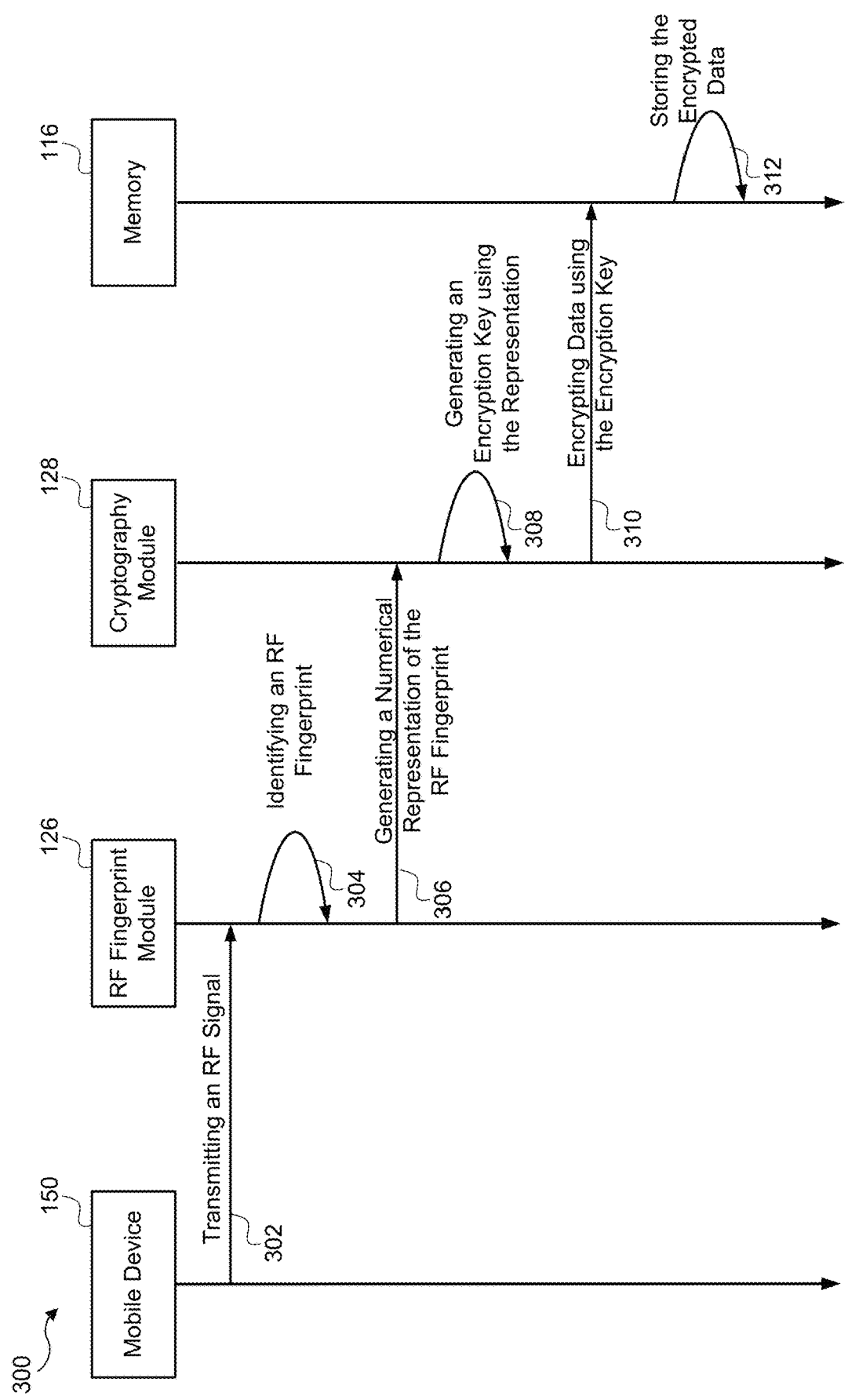
FIG. 3 illustrates an exemplary flow chart of storing encrypted data in accordance with aspects of the present disclosure.

FIG. 3 illustrates a flow diagram for storing encrypted data. At step 302, the mobile device 150 may transmit an RF signal to the RF fingerprint module 126. The RF signal may be a wireless signal having predetermined characteristic, such as frequency, waveform, amplitude, modulation, and/or phase. For example, the RF signal may be a 10 kilohertz sinusoidal signal with a root-mean-square voltage of 2.5 volt. In another example, the RF signal may be a 1 megahertz square signal with a root-mean-square (RMS) voltage of 1 volt. Other characteristics may also be used. The RF signal may include an RF fingerprint associated with the transceiver (not shown) of the mobile device. In some implementations, the RF fingerprint may include a specific transmission power, frequency spectrum, jitter, rise time, fall time, or any combination thereof associated with the transceiver of the mobile device 150. For example, the RF fingerprint may include a certain instantaneous RF power at a certain frequency. The mobile device 150 may transmit the RF signal directly to the RF fingerprint module 126, or via the communication device 124.

At step 304, the RF fingerprint module 126 may identify the RF fingerprint of the received RF signal. The RF fingerprint module 126 may measure the transmission power, RMS voltage, frequency spectrum, jitter, rise time, fall time, amplitude, and/or other characteristics associated with the RF signal. The combination of the characteristics of the RF signal may form the RF fingerprint of the RF signal.

At step 306, the RF fingerprint module 126 may generate a numerical representation of the RF fingerprint. For example, the RF fingerprint module 126 may generate a number 25450051107 indicating a 25.45 kilohertz signal with a rise time of 5 nanoseconds, a fall time of 11 nanoseconds, and a RMS voltage of 7 volts. In another example, the RF fingerprint module 126 may generate a number 3357120318 indicating a 33.57 megahertz signal having a rise time of 12 nanoseconds, a RMS voltage of 03 volts, and a frequency jitter of 18 percent. In yet another example, the RF fingerprint module 126 may generate a number 01030811152734486177 indicating the instantaneous voltage of the rise time of an RF signal at t=0 nanosecond, t=1 nanosecond, t=2 nanoseconds, t=3 nanoseconds, t=4 nanoseconds, t=5 nanoseconds, t=6 nanoseconds, t=7 nanoseconds, t=8 nanoseconds, t=9 nanoseconds, and t=10 nanoseconds. Other numerical representations may also be used. In some implementations, the RF fingerprint module 126 may send the numerical representation of the RF fingerprint to the cryptography system 128.

At step 308, the cryptography system 128 may generate an encryption key using the numerical representation. In some implementations, the cryptography system 128 may use a cryptographic hash function to deterministically map the numerical representation to the encryption key. The encryption key may be a numerical string having 2 to 2048 bits, 32 to 1024 bits, or 64 to 512 bits. Specifically, the encryption key may include 64 bits, 128 bits, 256 bits, 512 bits, or 1024 bits. In some examples, it may be computationally impractical to map the encryption key to the numerical representation. In other implementations, the cryptography system 128 may generate the encryption key using a portion of the numerical representation. For example, for the numerical representation of 01030811152734486177, the cryptography system 128 may utilize 486177 (i.e., the last six digits) to generate the encryption key. The selected portion may indicate a highly repeatable portion of the RF fingerprint relating to the mobile device 150.

At step 310, the cryptography system 128 may encrypt data received from the communication device 124, the memory 116, or other sources within or outside of the vehicle computer system 110, using the encryption key. The cryptography system 128 may perform a mathematical operation (interchangeably referred to as a cipher), such as an exclusive OR operation, to the received data to encrypt the data. The cryptography system 128 may transmit the encrypted data to the memory 116.

At step 312, the memory 116 may store the encrypted data. In optional implementations, the cryptography system 128 may discard the encryption key after encrypting the data. The memory 116 may store the encrypted data in an unsecure portion of the memory 116.

Figure 4:
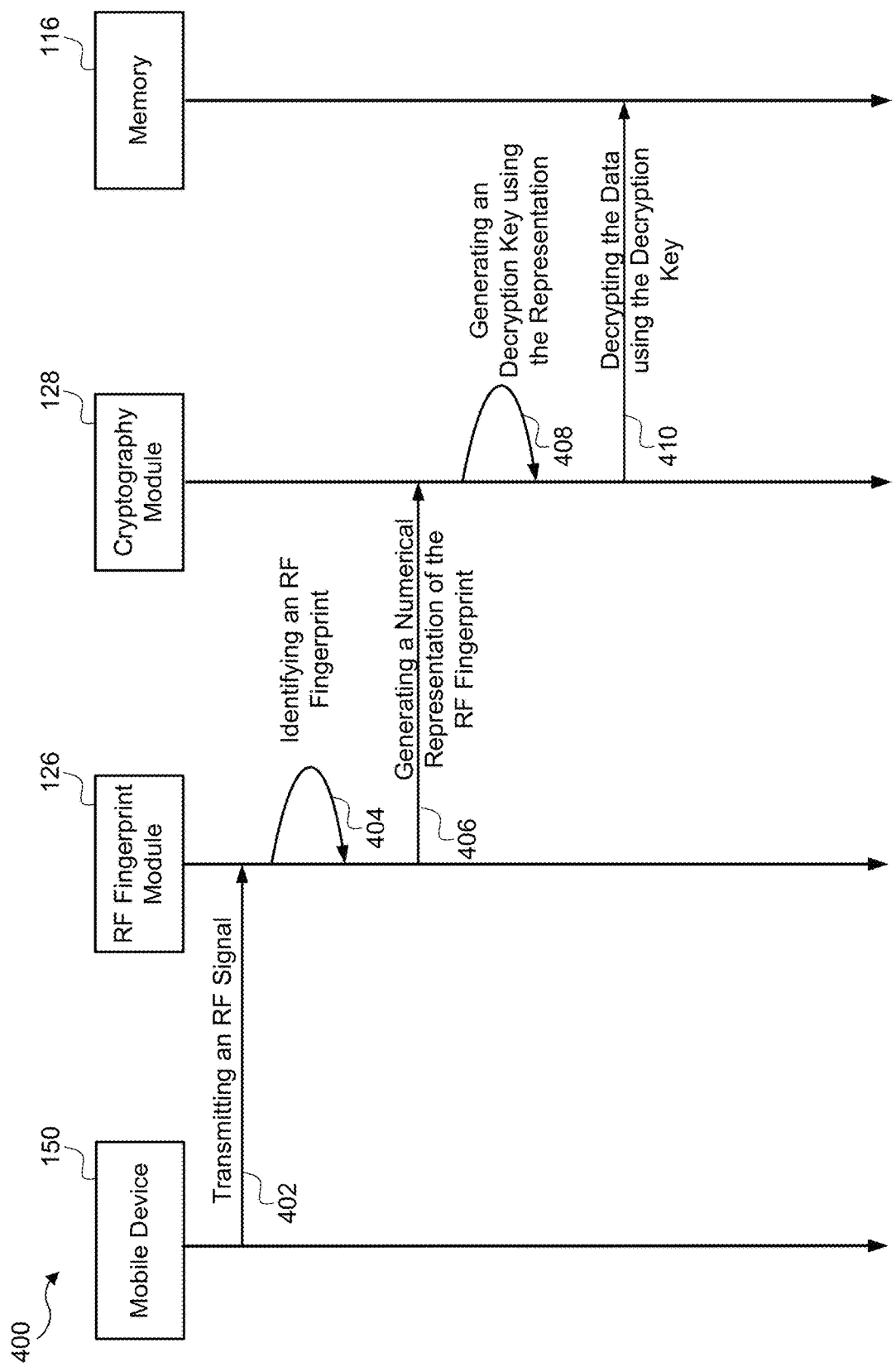
FIG. 4 illustrates an exemplary flow chart for decrypting encrypted data in accordance with aspects of the present disclosure.

FIG. 4 illustrates a flow diagram for decrypting encrypted data. At step 402, the mobile device 150 may transmit an RF signal to the RF fingerprint module 126. The RF signal may be a wireless signal having predetermined characteristic, such as frequency, waveform, amplitude, modulation, and/or phase. For example, the RF signal may be a 10 kilohertz sinusoidal signal with a root-mean-square voltage of 2.5 volt. In another example, the RF signal may be a 1 megahertz square signal with a root-mean-square (RMS) voltage of 1 volt. Signals having other characteristics may also be used. The RF signal may include an RF fingerprint associated with the transceiver (not shown) of the mobile device. In some implementations, the RF fingerprint may include a specific transmission power, frequency spectrum, jitter, rise time, fall time, or any combination thereof associated with the transceiver of the mobile device 150. For example, the RF fingerprint may include a predetermined instantaneous RF power at a predetermined frequency. The mobile device 150 may transmit the RF signal directly to the RF fingerprint module 126, or via the communication device 124.

At step 404, the RF fingerprint module 126 may identify the RF fingerprint of the received RF signal. The RF fingerprint module 126 may measure the transmission power, RMS voltage, frequency spectrum, jitter, rise time, fall time, amplitude, and/or other characteristics associated with the RF signal. The combination of the characteristics of the RF signal may form the RF fingerprint of the RF signal.

At step 406, the RF fingerprint module 126 may generate a numerical representation of the RF fingerprint. For example, the RF fingerprint module 126 may generate a number 25450051107 indicating a 25.45 kilohertz signal with a rise time of 5 nanoseconds, a fall time of 11 nanoseconds, and a RMS voltage of 7 volts. In another example, the RF fingerprint module 126 may generate a number 3357120318 indicating a 33.57 megahertz signal having a rise time of 12 nanoseconds, a RMS voltage of 03 volts, and a frequency jitter of 18 percent. In yet another example, the RF fingerprint module 126 may generate a number 01030811152734486177 indicating the instantaneous voltage of the rise time at t=0 nanosecond, t=1 nanosecond, t=2 nanoseconds, t=3 nanoseconds, t=4 nanoseconds, t=5 nanoseconds, t=6 nanoseconds, t=7 nanoseconds, t=8 nanoseconds, t=9 nanoseconds, and t=10 nanoseconds. Other numerical representations may also be used. In some implementations, the RF fingerprint module 126 may send the numerical representation of the RF fingerprint to the cryptography system 128.

At step 408, the cryptography system 128 may generate a decryption key using the numerical representation. In some implementations, the cryptography system 128 may use a cryptographic hash function to deterministically map the numerical representation to the decryption key. The decryption key may be a numerical string having 2 to 2048 bits, 32 to 1024 bits, or 64 to 512 bits. Specifically, the decryption key may include 64 bits, 128 bits, 256 bits, 512 bits, or 1024 bits. In some examples, it may be computationally impractical to map the decryption key to the numerical representation. In other implementations, the cryptography system 128 may generate the decryption key using a portion of the numerical representation. For example, for the numerical representation of 01030811152734486177, the cryptography system 128 may utilize 486177 (i.e., the last six digits) to generate the decryption key. The selected portion may indicate a highly repeatable portion of the RF fingerprint unique to users device.

At step 410, the cryptography system 128 may decrypt the encrypted data stored in the memory 116, or other sources within or outside of the vehicle computer system 110, using the decryption key. The cryptography system 128 may perform a mathematical operation, such as an exclusive OR operation, to decrypt the encrypted data.

Figure 5:
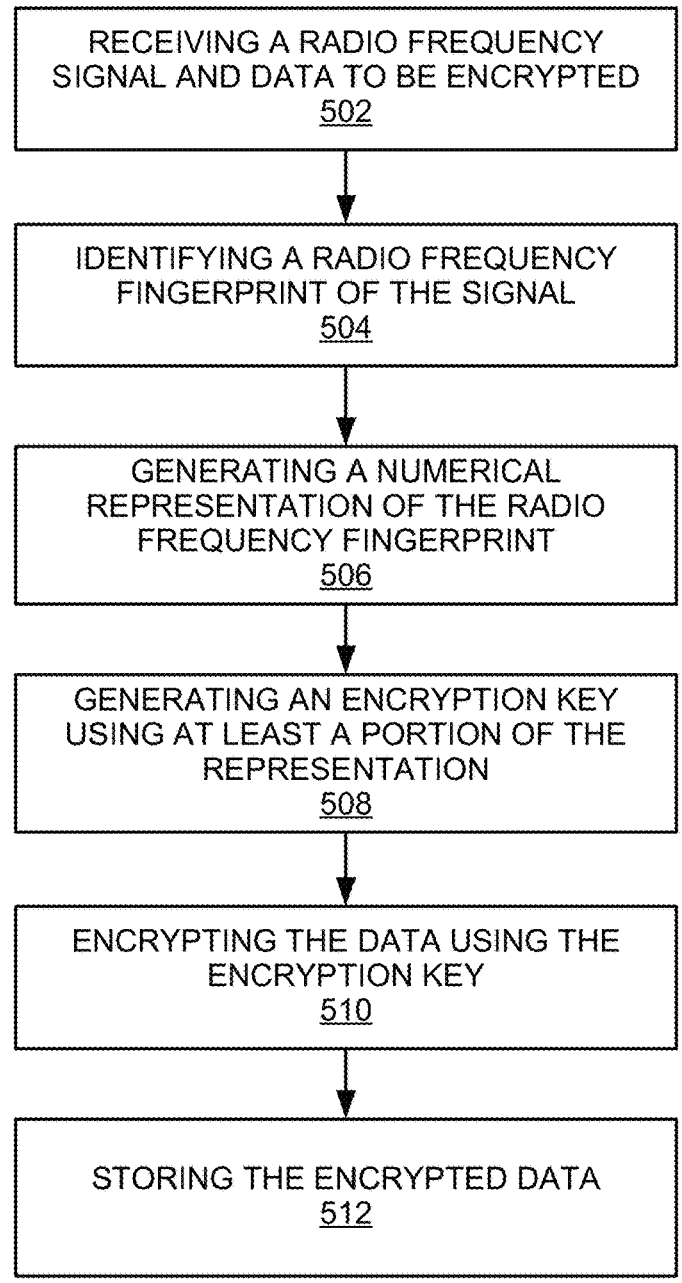
FIG. 5 illustrates an exemplary method for storing encrypted data in accordance with aspects of the present disclosure.

Referring now to FIG. 5, therein illustrated is an example of a method 500 for storing encrypted data. At block 502, the method 500 may receive an RF signal and data to be encrypted. For example, the RF fingerprint module 126 may receive an RF signal and data to be encrypted. The RF signal may be a wireless signal transmitted by the mobile device 150 of the user. The RF fingerprint module 126 may receive the data from the mobile device 150, the memory 116, or other sources.

At block 504, the method 500 may identify an RF fingerprint of the RF signal. For example, the RF fingerprint module 126 may measure the transmission power, RMS voltage, frequency spectrum, jitter, rise time, fall time, amplitude, and/or other characteristics associated with the RF signal. The combination of the characteristics of the RF signal may form the RF fingerprint of the RF signal.

At block 506, the method 500 may generate a numerical representation of the RF fingerprint. For example, the RF fingerprint module 126 may generate a number 25450051107 indicating a 25.45 kilohertz signal with a rise time of 5 nanoseconds, a fall time of 11 nanoseconds, and a RMS voltage of 7 volts.

At block 508, the method 500 may generate an encryption key using at least a portion of the numerical representation. For example, the cryptography system 128 may use a cryptographic hash function to deterministically map a portion of the numerical representation to the encryption key. In a non-limiting example, the cryptography system 128 may rely on the number 25450 (i.e., first five digits of the numerical representation) to generate an encryption key of 8172074565193927 (decimal).

At block 510, the method 500 may encrypt the data (e.g., 3583347068278536) using the encryption key. For example, the cryptography system 128 may perform a mathematical operation, such as an exclusive OR operation, to the received data and the encryption key to encrypt the data. The encrypted data may have the value of 4982421381826511. In some implementations, the encryption key and/or the data may be represented in binary, decimal, hexadecimal, or any other numbering system.

At block 512, the method 500 may store the encrypted data. For example, the cryptography system 128 and/or the processor 114 may store the encrypted data in the memory 116.

Figure 6:
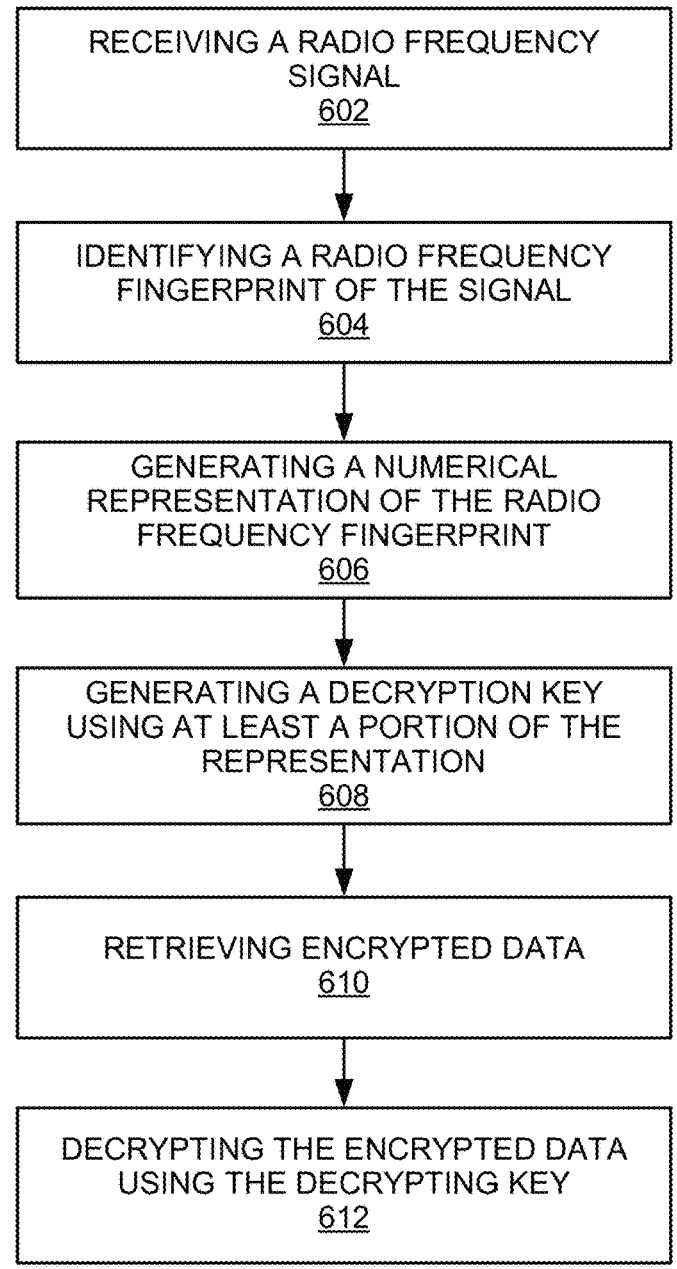
FIG. 6 illustrates an exemplary method for decrypting encrypted data in accordance with aspects of the present disclosure.

Referring now to FIG. 6, therein illustrated is an example of a method 600 for decrypting encrypted data. At block 602, the method 600 may receive an RF signal. For example, the RF fingerprint module 126 may receive an RF signal. The RF signal may be a wireless signal transmitted by the mobile device 150 of the user.

At block 604, the method 600 may identify an RF fingerprint of the RF signal. For example, the RF fingerprint module 126 may measure the transmission power, RMS voltage, frequency spectrum, jitter, rise time, fall time, amplitude, and/or other characteristics associated with the RF signal. The combination of the characteristics of the RF signal may form the RF fingerprint of the RF signal.

At block 606, the method 600 may generate a numerical representation of the RF fingerprint. For example, the RF fingerprint module 126 may generate a number 25450051107 indicating a 25.45 kilohertz signal with a rise time of 5 nanoseconds, a fall time of 11 nanoseconds, and a RMS voltage of 7 volts.

At block 608, the method 600 may generate a decryption key using at least a portion of the numerical representation. For example, the cryptography system 128 may use a cryptographic hash function to deterministically map a portion of the numerical representation to the encryption key. In a non-limiting example, the cryptography system 128 may rely on the number 25450 (i.e. first five digits of the numerical representation) to generate a decryption key of 8172074565193927 (decimal).

At block 610, the method 600 may retrieve the encrypted data. For example, the cryptography system 128 may retrieve the encrypted data (e.g., 4982421381826511 in decimal) stored in the memory 116 for decryption.

At block 612, the method 600 may decrypt the encrypted data using the decryption key. For example, the cryptography system 128 may perform a mathematical operation, such as an exclusive OR operation, to the encrypted data and the decryption key to decrypt the encrypted data. The decrypted data may have the value of 3583347068278536 (decimal). In some implementations, the encryption key and/or the data may be represented in binary, decimal, hexadecimal, or any other numbering system.

Figure 7:
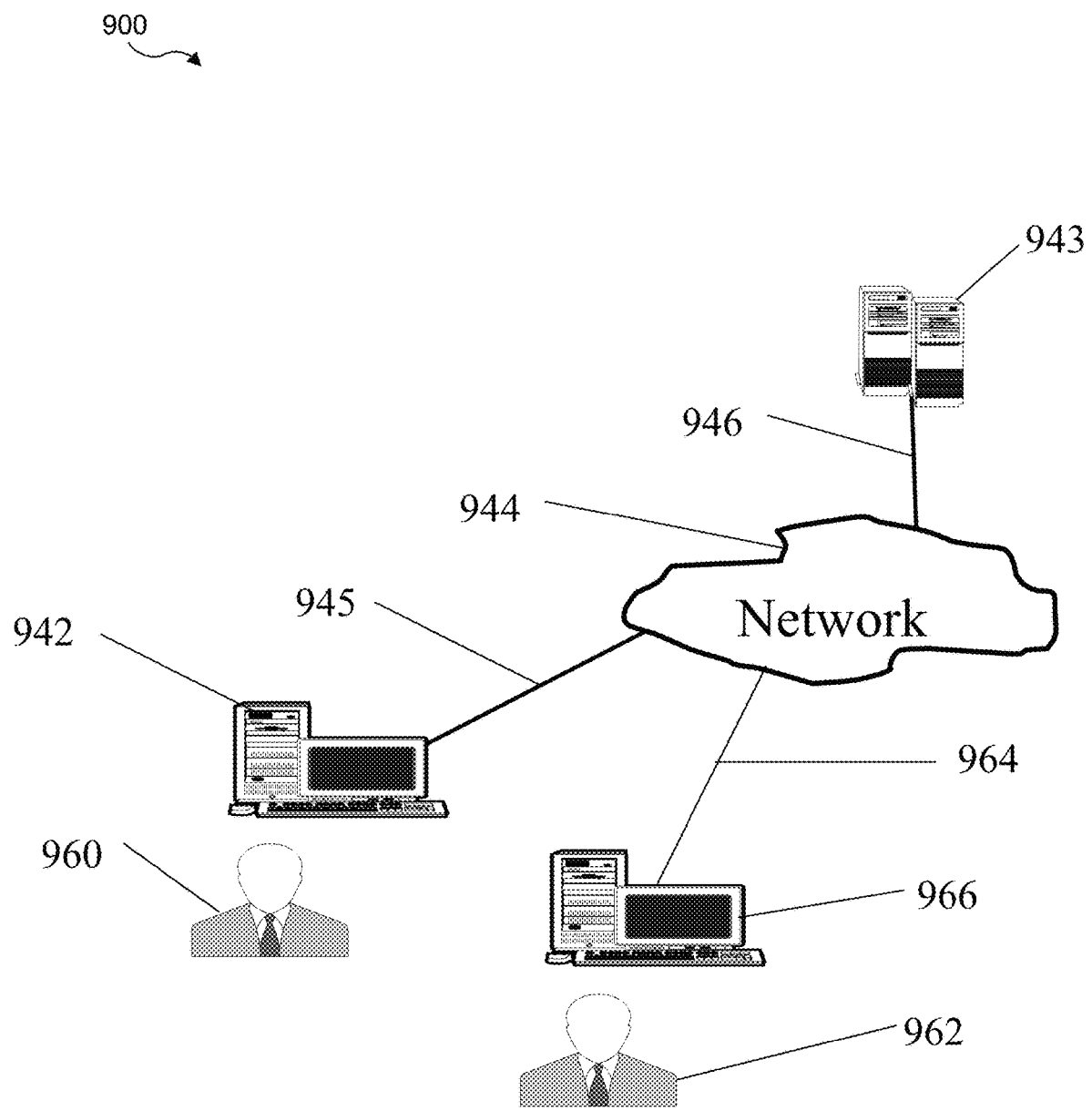
FIG. 7 illustrates a block diagram of various exemplary system components in accordance with aspects of the present disclosure.

FIG. 7 is a block diagram of various example system components, in accordance with an aspect of the present disclosure. FIG. 7 shows a communication system 900 usable in accordance with the present disclosure. The communication system 900 includes one or more accessors 960, 962 (also referred to interchangeably herein as one or more "users") and one or more terminals 942, 966. In one aspect, data for use in accordance with aspects of the present disclosure is, for example, input and/or accessed by accessors 960, 962 via terminals 942, 966, such as personal computers (PCs), minicomputers, mainframe computers, microcomputers, telephonic devices, or wireless devices, such as personal digital assistants ("PDAs") or a hand-held wireless devices coupled to a server 943, such as a PC, minicomputer, mainframe computer, microcomputer, or other device having a processor and a repository for data and/or connection to a repository for data, via, for example, a network 944, such as the Internet or an intranet, and couplings 945, 946, 964. The couplings 945, 946, 964 include, for example, wired, wireless, or fiberoptic links. In another example variation, the method and system in accordance with aspects of the present disclosure operate in a stand-alone environment, such as on a single terminal.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of storing encrypted data, comprising:
receiving a radio frequency signal and data to be encrypted;
identifying a radio frequency fingerprint of the signal;
generating a first numerical representation of the radio frequency fingerprint;
generating an encryption key based on the first numerical representation of the radio frequency fingerprint;
encrypting the data using the encryption key; and storing the encrypted data;
receiving a second radio frequency signal;
identifying a second radio frequency fingerprint of the second radio frequency signal;
generating a second numerical representation of the second radio frequency fingerprint;
generating a decryption key based on the second numerical representation of the second radio frequency fingerprint; retrieving the encrypted data; and
decrypting the encrypted data using the decryption key; wherein the first and the second numerical representations are different, and are generated at different times.

2. The method of claim 1, wherein the numerical representation of the radio frequency fingerprint includes numbers indicating at least one of a transmission power, a frequency spectrum, a jitter, a rise time, and a fall time of the radio frequency signal.

3. The method of claim 1, wherein the encryption key includes 64 bits, 128 bits, 256 bits, 512 bits, or 1024 bits.

4. The method of claim 1, wherein storing the encrypted data further includes storing the encrypted data in an unsecure memory.

5. The method of claim 1, further comprising discarding the encryption key after encrypting the data.

6. The method of claim 1, further comprising discarding the decryption key after decrypting the encrypted data.

7. A system, comprising:
a memory;
a cryptography module;
a radio frequency module;
the cryptography module, and the radio frequency module are stored in the memory and executed by one or more processors, the one or more processors being configured to:
receive a radio frequency signal and data to be encrypted;
identify a radio frequency fingerprint of the signal;
generate a first numerical representation of the radio frequency fingerprint;
generate an encryption key based on the first numerical representation of the radio frequency fingerprint;
encrypt the data using the encryption key; and
store the encrypted data;
receive a second radio frequency signal;
identify a second radio frequency fingerprint of the second radio frequency signal;
generate a second numerical representation of the second radio frequency fingerprint;
generate a decryption key based on the second numerical representation of the radio frequency fingerprint;
retrieve the encrypted data; and decrypt the encrypted data using the decryption key;
wherein the first and the second numerical representations are different, and are generated at different times.

8. The system of claim 7, wherein the numerical representation of the radio frequency fingerprint includes numbers indicating at least one of a transmission power, a frequency spectrum, a jitter, a rise time, and a fall time of the radio frequency signal.

9. The system of claim 7, wherein the encryption key includes 64 bits, 128 bits, 256 bits, 512 bits, or 1024 bits.

10. The system of claim 7, wherein storing the encrypted data further includes storing the encrypted data in an unsecure memory.

11. The system of claim 7, wherein the one or more processors are further configured to discard the encryption key after encrypting the data.

12. The system of claim 7, wherein the one or more processor are further configured to discard the decryption key after decrypting the encrypted data.

13. A non-transitory computer readable medium having instructions stored therein that, when executed by one or more processors, cause the one or more processors to:
receive a radio frequency signal and data to be encrypted;
identify a radio frequency fingerprint of the signal;
generate a first numerical representation of the radio frequency fingerprint;
generate an encryption key based on the first numerical representation of the radio frequency fingerprint;
encrypt the data using the encryption key; and
store the encrypted data;
receive a second radio frequency signal;
identify a second radio frequency fingerprint of the second radio frequency signal;
generate a second numerical representation of the second radio frequency fingerprint;
generate a decryption key based on the second numerical representation of the radio frequency fingerprint;
retrieve the encrypted data; and
decrypt the encrypted data using the decryption key;
wherein the first and the second numerical representations are different, and are generated at different times.

14. The non-transitory computer readable medium of claim 13, wherein the numerical representation of the radio frequency fingerprint includes numbers indicating at least one of a transmission power, a frequency spectrum, a jitter, a rise time, and a fall time of the radio frequency signal.

15. The non-transitory computer readable medium of claim 13, wherein storing the encrypted data further includes storing the encrypted data in an unsecure memory.

16. The non-transitory computer readable medium of claim 13, further comprises instructions stored therein that, when executed by the one or more processors, cause the one or more processors to discard the encryption key after encrypting the data.

17. The non-transitory computer readable medium of claim 13, further comprises instructions stored therein that, when executed by the one or more processors, cause the one or more processors to discard the decryption key after decrypting the encrypted data.

* * * * *